(12) United States Patent
Foster et al.

(10) Patent No.: US 12,147,279 B2
(45) Date of Patent: Nov. 19, 2024

(54) TRANSFERRABLE INTERFACE

(71) Applicant: Apple Inc., Cupertino, CA (US)

(72) Inventors: James H. Foster, Oxford (GB);
Durrell Bishop, London (GB); Emma Clark, Farncombe (GB); Nicolas V. Scapel, London (GB)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 17/653,111

(22) Filed: Mar. 1, 2022

(65) Prior Publication Data
US 2022/0291726 A1   Sep. 15, 2022

Related U.S. Application Data

(60) Provisional application No. 63/158,766, filed on Mar. 9, 2021.

(51) Int. Cl.
| | |
|---|---|
| *H04W 4/80* | (2018.01) |
| *G06F 1/16* | (2006.01) |
| *G06F 3/02* | (2006.01) |
| *G06F 3/04847* | (2022.01) |
| *G06Q 20/32* | (2012.01) |

(52) U.S. Cl.
CPC .......... *G06F 1/1698* (2013.01); *G06F 3/0202* (2013.01); *G06F 3/04847* (2013.01); *G06Q 20/321* (2020.05); *G06Q 20/3278* (2013.01); *H04W 4/80* (2018.02)

(58) Field of Classification Search
CPC .. G06F 1/1698; G06F 3/0202; G06F 3/04847; H04W 4/80; G06Q 20/321; G06Q 20/3278

USPC .................................................. 455/556.1
See application file for complete search history.

(56) References Cited

U.S. PATENT DOCUMENTS

| | | | |
|---|---|---|---|
| 7,079,976 B2 * | 7/2006 | Nelson .............. | G01G 23/3735 702/173 |
| 7,890,134 B2 * | 2/2011 | Richardson ....... | H04M 1/72436 455/90.3 |
| 10,924,603 B1 * | 2/2021 | Clements .............. | G06Q 20/18 |

(Continued)

FOREIGN PATENT DOCUMENTS

| | | |
|---|---|---|
| CN | 106537849 A | 3/2017 |
| CN | 111392534 A | 7/2020 |

(Continued)

OTHER PUBLICATIONS

International Search Report and Written Opinion for International Application No. PCT/US2022/070999, mailed Jun. 20, 2022 (15 pp.).

(Continued)

*Primary Examiner* — April G Gonzales
(74) *Attorney, Agent, or Firm* — Dorsey & Whitney LLP

(57) ABSTRACT

A portable electronic device can include a display, a processor, a sensor, and a wireless communication module. The sensor can detect a presence of an operable object near the portable electronic device. The processor can cause the display to depict an interface corresponding to the operable object based at least in part on a detection of the presence of the operable object. The wireless communication module can emit a signal instructing the operable object to perform an action based at least in part on an input to the interface.

20 Claims, 9 Drawing Sheets

(56) References Cited

U.S. PATENT DOCUMENTS

| | | | | |
|---|---|---|---|---|
| 11,072,515 | B2* | 7/2021 | Witczak | B66B 1/3461 |
| 11,430,407 | B2* | 8/2022 | Huang | G06F 3/0421 |
| 11,528,759 | B1* | 12/2022 | Kennedy | H04L 67/12 |
| 11,537,352 | B1* | 12/2022 | Clements | G06Q 20/18 |
| 11,597,402 | B2* | 3/2023 | Gordon | B60W 40/06 |
| 2005/0181777 | A1* | 8/2005 | Kim | G06F 3/0236 |
| | | | | 455/418 |
| 2007/0060176 | A1* | 3/2007 | Sloo | G06F 9/451 |
| | | | | 455/566 |
| 2012/0172061 | A1* | 7/2012 | Dods | G01C 21/20 |
| | | | | 455/457 |
| 2012/0302291 | A1* | 11/2012 | Mori | G06F 3/018 |
| | | | | 455/566 |
| 2014/0176501 | A1* | 6/2014 | Liou | G06F 3/0421 |
| | | | | 345/175 |
| 2015/0145655 | A1* | 5/2015 | Slupik | G08C 17/02 |
| | | | | 340/12.5 |
| 2016/0198319 | A1* | 7/2016 | Huang | G06F 1/1694 |
| | | | | 455/412.2 |
| 2016/0373296 | A1* | 12/2016 | Jeong | H04L 41/08 |
| 2019/0202662 | A1* | 7/2019 | Kattainen | B66B 1/2458 |

FOREIGN PATENT DOCUMENTS

| | | |
|---|---|---|
| CN | 111422708 A | 7/2020 |
| CN | 111792463 A | 10/2020 |
| CN | 112202438 A | 1/2021 |
| CN | 112272352 A | 1/2021 |
| JP | 2018060314 A | 4/2018 |
| TW | 201135787 A | 10/2011 |
| WO | 2020153933 A1 | 7/2020 |

OTHER PUBLICATIONS

"Button App", https://neatebox.com/button, available at least as early as Aug. 20, 2020, 6 pp.

"Smartphone-Based System Improves Safety and Mobility for Visually Impaired Pedestrians", U.S. Department of Transportation, https://www.transportation.gov/utc/smartphone-based-system-improves-safety-and-mobility-visually-impaired-pedestrians, Sep. 2014, 3 pp.

Kintronics, Inc., "Intercom for Apartments and Large Organizations", https://kintronics.com/products/door-access-control/intercoms-mobile-devices/, available at least as early as Aug. 20, 2020, 5 pp.

Schaefer, "Liftboy—App-Based Elevator Call & Floor Selection", https://schaefer-products.com/liftboy, available at least as early as Aug. 20, 2020, 5 pp.

Schindler, "myPORT Mobile Solutions", https://us.schindler.com/en/elevators/destination-control/myport.html, available at least as early as Aug. 20, 2020, 8 pp.

Schaefer, "Liftboy—App-Based Elevator Call & Floor Selection", https://schaefer-products.com/liftboy, available at east as early as Aug. 20, 2020, 5 pp.

* cited by examiner

TRANSFERRABLE INTERFACE

CROSS-REFERENCE TO RELATED APPLICATIONS

This application claims the benefit of U.S. Provisional Patent Application No. 63/158,766, filed Mar. 9, 2021, entitled "TRANSFERRABLE INTERFACE", the disclosure of which is incorporated herein by reference in its entirety.

FIELD

The described examples relate generally to user interfaces. More particularly, the present examples relate to supplementing inputs from an object using a user interface.

BACKGROUND

People all over the world are commonly and consistently carrying at least one portable electronic device on their person. Portable electronic devices, such as smart phones, smart watches, tablet computers, or other devices can provide functionality that is beneficial in organizing, planning, and executing various daily tasks. For example, portable electronic devices can provide valuable utility to a user of the electronic device relating to time management, appointment scheduling, exercising, communications, navigation, shopping, entertainment, and many other activities. Moreover, some portable electronic devices can provide utility relating to health monitoring, such as, sleep tracking or heart-rate monitoring.

SUMMARY

According to some examples of the present disclosure, a portable electronic device can include a display, a processor, a sensor, and a wireless communication module. The sensor can detect a presence of an operable object near the portable electronic device. The processor can cause the display to depict an interface corresponding to the operable object based, at least in part, on a detection of the presence of the operable object. The wireless communication module can emit a signal instructing the operable object to perform an action based, at least in part, on an input to the interface.

In some examples, the portable electronic device can include a smart phone, a smart watch, or a tablet computing device. The interface can correspond to an input component of the operable object. The sensor can detect the presence of the operable object based at least in part on receiving a radio wave emitted by the operable object. The operable object can include a button. The interface can visually resemble the button and the input can include a touch input. The signal can inform the operable object of a presence of the user at the operable object.

The portable electronic device can download information when the sensor detects the presence of the operable object. A characteristic of an input element generated in the interface can correspond to the information. This signal can be a first signal and the wireless communication module can receive a second signal from the operable object. The processor can perform an action based, at least in part, on the second signal. Causing the display to depict an interface corresponding to the operable object can include causing the display to depict the interface on a portion of the display.

According to some examples, an operable device can include a controller, an operable component, and a communication module. The communication module can transmit a first signal to a portable electronic device. The first signal comprising identification information. Additionally, or alternatively, the communication module can receive a second signal from the portable electronic device. The second signal can include instructions. The controller can cause the operable component to perform an action based at least in part on the instructions.

In some examples, the identification information can include a unique operable device identifier. The second signal can further include a unique user identifier. The action can include a transaction. The operable device can include an input component communicatively coupled to the controller. The controller can cause the operable component to perform the action based at least in part on an input received by the input component. The input component can include at least one of an analog input component or a digital input component. A number of input components can include combinations of analog and digital inputs used for operating a physical machine. Example analog input components can include one or more physical and tactile input mechanisms such as buttons, switches, toggles, levers, or knobs. Example digital input components can include touch-screens and other digital user interfaces. The first signal can include information relating to at least one of a size, an appearance, or a position of an input element of a user interface to be depicted by the portable electronic device. The identification information can include at least one of information related to a type of the operable device or a location of the operable device. The communication module can include at least one of an Ultra Wideband (UWB) module, a Bluetooth module, a Wi-Fi module, or a Near-Field Communication (NFC) module. The communication module can continuously transmits the first signal in some examples. The portable electronic device can include a smart watch, a smart phone, or a tablet computing device.

According to some examples, a method is disclosed including detecting an operable device. The method can include receiving information based, at least in part, on detecting the operable device. The method can include generating a user interface on an electronic device based on the received information. The method can include receiving an input from a user at the user interface. The method can include emitting a signal including instructions that, when received by the operable device, cause the operable device to perform an action associated with the input.

In some examples, the method further includes prompting a user to initiate receiving the information. The operable device can include an automated teller machine (ATM), a pedestrian crossing system, a medical device, an elevator control system, a door access control system, an intercom system, or a vending machine. The input can include a touch input, a voice input, a gesture input, a sliding-touch input, or a near-touch input.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Figure 1:
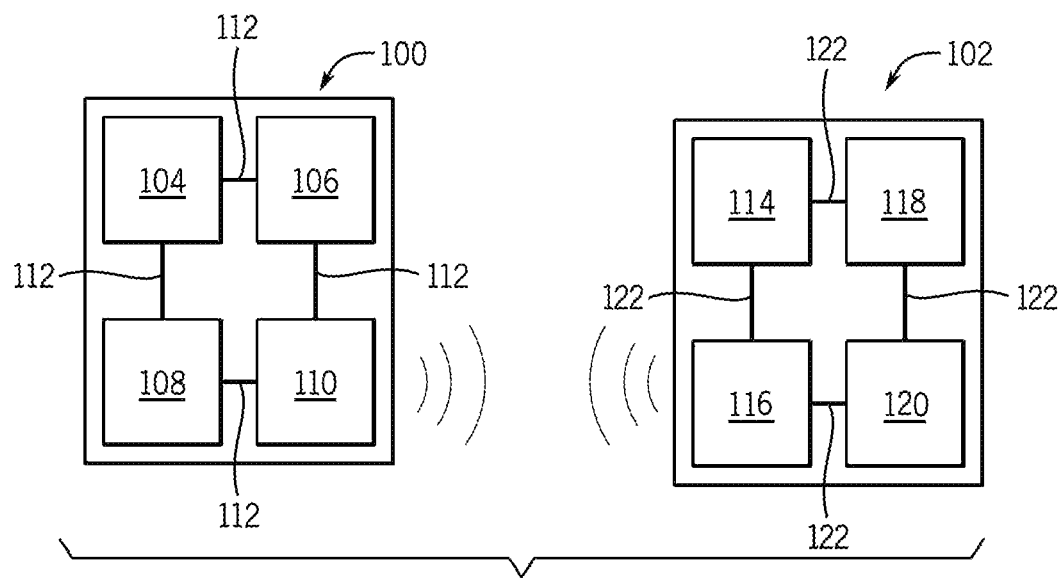
FIG. 1 shows a block diagram including a portable electronic device and an operable object.

Reference will now be made in detail to representative examples illustrated in the accompanying drawings. It should be understood that the following descriptions are not intended to limit the examples to one preferred example. To the contrary, it is intended to cover alternatives, modifications, and equivalents as can be included within the spirit and scope of the described examples as defined by the appended claims.

Portable electronic devices, such as smart phones, tablet computing devices, smart watches, and headphones, have become commonplace and virtually essential for accessing electronic information and communicating with others. Moreover, portable electronic devices can provide assistance in completing daily tasks and errands. For example, a user of a portable electronic device can generate a shopping list or monitor their progress during and after an exercise routine. However, some daily activities can expose the user to public surfaces that may contain harmful pathogens, such as, viruses and bacteria. For example, contact with common or public operable objects or operable devices, such as elevators, pedestrian crossing systems, medical devices, and automated teller machines (ATMs), can expose the user to harmful pathogens deposited on a button or other input component of the operable object by a previous user of the operable object. The user can also place others at risk by spreading the pathogens after coming into contact with the compromised button or other input component of the operable object.

Additionally, the input components for these public operable devices may need to be robust to withstand repeated use by numerous users. This robustness, or other requirements for the operable device, often result in binary switches and buttons and can limit the ways that a user can interact with, or provide inputs to, the operable device. Such an operable device, however, may be capable of additional or more complex functionalities than can be controlled with the binary or simplified built-in input components of the operable device.

One aspect of the present disclosure relates to supplementing a button, an interface, or an input component of an operable object with a user interface on a display of a portable electronic device. In other words, a user's portable electronic device can detect the presence of an operable object (e.g., a crosswalk button, an elevator, an ATM, a medical device, and any other physical machine, system, or object that performs a function or operation in response to a received signal, often generated by interaction with a button or user interface), and can generate a user interface which allows the user to operate the operable object without physically touching the operable object. In some examples, the operable object can be any object that is publically available or accessible to the user and other members of the general public, and includes a physical/tactile/real input interface or component with at least one physical button, lever, or input area. In some examples, the portable electronic device can include a display, a processor, a sensor, and a wireless communication module. The sensor can detect a presence of an operable object near the portable electronic device. The processor can cause the display to depict an input region corresponding to the operable object based, at least in part, on a detection of the presence of the operable object. The input region can include a user interface which corresponds to an operable object, such that the input region or the generated user interface mimics an input component or physical interface of the operable object. For example, the user interface can include any number of displays, virtual sliders, buttons, switches, and fields representative of the actual displays, sliders, buttons, switches, and fields of the operable object. The wireless communication module can emit a signal instructing the operable object to perform an action based, at least in part, on an input entered to the input region.

Another aspect of the present disclosure relates to a method for supplementing an input component of an operable device. The method can include detecting the operable device. In one example, a portable electronic device can detect the operable device by receiving a radio wave emitted by the operable device. Once the operable device is detected, the method can then further include receiving information about the operable device and generating a user interface on the portable electronic device based on the received information. For example, the portable electronic device can download information when a sensor detects the presence of the operable device. The method can further include receiving an input from a user at the interface. For example, the input can include a touch input, a voice input, a gesture input, a sliding-touch input, a near-touch input, another type of input, or a combination thereof. Subsequent to receiving an input from a user at the interface, the portable electronic device can then emit a signal including instructions that, when received by the operable device, cause the operable device to perform an action associated with the input. For example, the operable device can be communicatively coupled to a door of a building and the instructions can cause the operable device to open the door without the user physically touching a door handle of the door.

These and other examples are discussed below with reference to FIGS. 1-9. However, those skilled in the art will readily appreciate that the detailed description given herein with respect to these Figures is for explanatory purposes only and should not be construed as limiting. Furthermore, as used herein, a system, a method, an article, a component, a feature, or a sub-feature including at least one of a first option, a second option, or a third option should be understood as referring to a system, a method, an article, a component, a feature, or a sub-feature that can include one of each listed option (e.g., only one of the first option, only one of the second option, or only one of the third option), multiple of a single listed option (e.g., two or more of the first option), two options simultaneously (e.g., one of the first option and one of the second option), or combination thereof (e.g., two of the first option and one of the second option).

FIG. 1 shows a block diagram including a portable electronic device 100 and an operable object 102. The portable electronic device 100 can represent one or more portable electronic devices, such as, one or more smart phones, head-mounted devices or displays (e.g., computer glasses, smart glasses, virtual reality (VR) headsets, mixed reality headsets, augmented reality (AR) headsets or goggles, and any head-mounted electronic device configured or adaptable for non-immersive experiences directly interacting with the physical environment, semi-immersive experiences combining interaction with the physical environment and a virtual environment, and/or fully-immersive experiences interacting exclusively with a virtual environment), tablet computing devices, smart watches, laptop computing devices, or any other portable electronic devices. The operable object 102 can also be referred to as an operable device, as such, the terms operable object, operable device, and device can be used interchangeably herein. The operable object 102 can be any physical machine or system having a user input component or interface which can be operated by more than one user. For example, the operable object 102 can be an electrically powered machine or electrically powered device commonly operated by multiple discrete users to perform a task. In some examples, the operable object 102 can be an automated teller machine (ATM), a pedestrian crossing system, a medical device, a control system for an elevator, a door access control system, an intercom system, a vending machine, a product kiosk, a printer or copy machine, a vehicle, including a semi or fully autonomous vehicle, an industrial machine, a factory assembly line, a processing system, and/or any other physical machine or system having a user input component or interface, and/or combinations thereof.

The portable electronic device 100 can include a display 104, a processor 106, one or more sensors 108, and a wireless communication module 110. Each of the display 104, the processor 106, the one or more sensors 108, and the wireless communication module 110 can be operably connected through a communication path 112. The communication path 112 can be a wired or wireless communication path which electrically couples one or more components (e.g., the display 104, the processor 106, the one or more sensors 108, and the wireless communication module 110) within the portable electronic device 100. For example, the communication path 112 can be a serial bus that communicatively couples the components of the portable electronic device 100.

The display 104 can be any form of display, component, or device used to display visual content to a user. For example, the display 104 can be an LED display, an OLED display, an LCD display, or any other form of display now known in the art, or as may be developed in the future. In some examples, the display 104 can be a touch screen display, or can have touch detecting capabilities, such as, capacitive touch, force touch, and near touch capabilities. For example, the display 104 can define a user input region which can receive input from a user of the portable electronic device 100. The display 104 can include one or more layers (e.g., a capacitive touch layer) and/or components, disposed within an internal volume defined by the portable electronic device 100, to detect user inputs at or near the user input region.

The processor 106 can include one or more computer processors, controllers, or microcontrollers that perform operations in response to receiving computer-readable instructions. The processor 106 can include a central processing unit (CPU) of the portable electronic device 100. Additionally, or alternatively, the processor 106 can include other processors within the portable electronic device 100 including application specific integrated chips (ASIC) and other microcontrollers.

The processor 106 can be operably coupled to a memory (not shown) disposed within or communicatively coupled to the portable electronic device 100. The memory can include a variety of types of non-transitory computer-readable storage media, including, for example, read access memory (RAM), read-only memory (ROM), erasable programmable memory (e.g., EPROM and EEPROM), or flash memory. The memory can store the computer-readable instructions. Additionally, or alternatively, the memory can include a variety of types of non-transitory computer-readable storage media including, for example, a hard-drive storage device, a solid state storage device, a portable magnetic storage device, or another similar device. The processor 106 can read computer-readable instructions stored on the memory. The computer-readable instructions can cause the processor 106 to perform the operations, functions, and aspects of the disclosure described herein. The computer-readable instructions can be provided as a computer-program product, software application, or the like.

In some examples, the portable electronic device 100 can also include one or more power supplies or power sources (not shown) positioned within the portable electronic device 100 and operably coupled to one or more of the display 104, the processor 106, the one or more sensors 108, and the wireless communication module 110. The one or more power supplies can be rechargeable and can provide electrical power to the display 104, the processor 106, the one or more sensors 108, and the wireless communication module 110 of the portable electronic device 100. The one or more power supplies can include any device capable of storing and discharging electricity, such as one or more lithium-ion polymer batteries or other forms of electrical power storage.

The one or more sensors 108 can be disposed within the portable electronic device 100. The one or more sensors 108 can detect a presence of the operable object 102 when the portable electronic device 100 is near or within a proximity of the operable object 102. For example, the operable object 102 can emit a signal (e.g., a radio wave) and the one or more sensors 108 can detect or receive the signal when the portable electronic device 100 is sufficiently close to the operable object 102. The signal emitted from the operable object 102 can be a radio wave having a frequency and magnitude which conforms to a wireless communication protocol, such as, Ultra Wideband (UWB), Bluetooth, Wi-Fi, Near-field Communication (NFC), or another wireless communication protocol. The operable object 102 can emit the signal intermittently or continuously. For example, the operable object 102 can emit the signal periodically throughout a duration of time, such as, emitting the signal every 5 second for a 2 hour duration of time. The period at which the signal is emitted can be any period between 1 millisecond and 1 hour. In some examples, the period can vary relative to an anticipated usage of the operable object 102. For example, the operable object 102 can be a pedestrian crossing system or crosswalk system and the period at which the crosswalk system emits a signal may desirably be more frequent (e.g., a smaller period) when the anticipated usage of the crosswalk system is higher, such as, when a sporting event is held at a venue adjacent the crosswalk system. The signal (e.g., a radio wave) can inform the pedestrian crossing system (i.e., crosswalk system) of a presence of the user at a crossing.

The one or more sensors 108 can detect the presence of the operable object 102 near the portable electronic device 100. The portable electronic device 100 can be disposed near the operable object 102 when a distance between the portable electronic device 100 and the operable object 102 is less than 1 meter, between about 1 meter to about 5 meters, between about 5 meters to about 25 meters, between about 25 meters to about 50 meters, or less than about 200 meters. In some examples, the portable electronic device 100 can be positioned within half a meter from the operable object 102 to cause the one or more sensors 108 to detect the presence of the operable object 102.

In some examples, the one or more sensors 108 can include any number or combination of sensor types, including but not limited to, a force sensor, a position sensor, a pressure sensor, a capacitive sensor, a piezo sensor, photo optic sensors, a laser sensor, an ultrasonic sensor, a hall effect sensor, and the like. In one example the one or more sensors 108 can include an optical sensor and/or other sensor that can detect a presence of the operable object 102 when the portable electronic device 100 is near or within a proximity of the operable object 102, without a need for the operable object 102 to emit a signal of any kind. In some examples, the one or more sensors 108 can include a camera which detects the presence of the operable object 102 by capturing an image of the operable object 102, a portion of the operable object 102, or an attribute of the operable object 102. For example, the one or more sensors 108 can include a camera which is used to detect a light pulse, a Quick Response (QR) code, or another optically recognizable image or design visible on the operable object 102. The one or more sensors 108 (along with the processor 106) can implement image recognition techniques or computer vision to detect the presence of the operable object 102 near the portable electronic device 100.

In some examples, the communication module, such as the wireless communication module 110, can wirelessly transmit and/or receive data relative to the operable object 102. In some examples, the wireless communication module 110 can include one or more wireless transmitter and/or systems, including antenna systems, such as WIFI, Bluetooth, UWB, cellular, LTE, 5G, GPS, ZigBee, radio, or any other form of wireless transmission systems. These systems can facilitate wireless communication with other devices (e.g., the operable object 102). Each of the one or more wireless antenna systems can transmit and/or receive wireless signals at one or more frequencies. For example, the wireless communication module 110 can transmit instructions to the operable object 102 that, when received, cause the operable object 102 to perform an action (e.g., change intersection signals and engage a crosswalk countdown for a pedestrian).

In some examples, the operable object 102 can include an input component 114, a communication module 116, a controller 118, and an operable component. Each of the input component 114, the communication module 116, the controller 118, and the operable component 120 can be operably connected through a communication path 122. The communication path 122 can be a wired or a wireless communication path which electrically couples one or more components (e.g., the input component 114, the communication module 116, the controller 118, the operable component 120, or other components) within the operable object 102. For example, the communication path 122 can be a serial bus that communicatively couples the components of the operable object 102.

The input component 114 can be one or more buttons, switches, toggles, levers, knobs, touch-screens, other input components, or combinations thereof. In some examples, the controller 118 can cause the operable component 120 to perform an action based at least in part on an input received by the input component 114. For example, an ATM can be considered an example of an operable object 102, and the buttons on the ATM by which a user interfaces with the ATM can be considered the input component 114. When actuated, the input component 114 can cause the operable object 102 to perform an action or a task (e.g., withdraw currency from the ATM). The communication module 116 can include one or more antennas and controllers which enable wireless communication between the operable object 102 and another device (e.g., the portable electronic device 100). In other words, the communication module 116 can transmit and/or receive signals (e.g., radio waves) from devices. Accordingly, the communication module 116 can include one or more wireless antenna systems, such as WIFI, Bluetooth, UWB, cellular, LTE, 5G, GPS, or any other form of wireless antenna system. For example, the communication module 116 can emit a signal, such as a radio wave, that is detectable by the one or more sensors 108 of the portable electronic device 100. Additionally, or alternatively, the communication module 116 can receive or detect signals transmitted by the portable electronic device 100 that instruct the operable object 102 to perform an action or task.

The controller 118 can include one or more computer processors, controllers or microcontrollers that perform operations in response to receiving computer-readable instructions. Additionally, or alternatively, operational instructions received at the communication module 116 can be provided to the controller 118 to cause the controller 118 to perform an action or task (e.g., change intersection signals and engage a crosswalk countdown for a pedestrian)). The controller 118 can include processors within the operable object 102 including application specific integrated chips (ASIC) and other microcontrollers.

The controller 118 can be operably coupled to a memory (not shown) disposed within or communicatively coupled to the operable object 102. The memory can include a variety of types of non-transitory computer-readable storage media, including, for example, read access memory (RAM), read-only memory (ROM), erasable programmable memory (e.g., EPROM and EEPROM), or flash memory. The memory can store the computer-readable instructions. Additionally, or alternatively, the memory can include a variety of types of non-transitory computer-readable storage media including, for example, a hard-drive storage device, a solid state storage device, a portable magnetic storage device, or another similar device. The controller 118 can read computer-readable instructions stored on the memory. The computer-readable instructions can cause the controller 118 to perform the operations, functions, and aspects of the disclosure described herein. The computer-readable instructions can be provided as a computer-program product, software application, or the like.

The operable component 120 can be any component of the operable object 102 capable of performing an action. For example, the operable component 120 can include any operable object such as one or more buttons, dials, knobs, touch detecting surfaces, displays, a combination thereof, or any other component or combination of components capable of performing one or more actions or influencing the operation of the operable object 102. The operable component 120 can be depressed, turned, pressed, flipped, rotated, or otherwise actuated to perform the action associated with the operable object 102. Examples of an operable object 102 and its associated operable component 120 can include, but is in no way limited to, a pedestrian crossing system and a cross-button; an ATM and an ATM user interface; an access keypad; an elevator control system and push-buttons; a door access control system and a near-field communication terminal; a medical device and a touch-display panel; an autonomous vehicle and a push-button start; or other systems or devices capable of performing an action having one or more of the examples of operable components 120 listed above.

In some examples, the operable object 102 can be a pedestrian crossing system and the operable component 120 can be a streetlight which alters an emitted color to stop traffic while a pedestrian crosses the street. Additionally, or alternatively, the operable component 120 can be a lighted display which depicts a numerical countdown sequence correlating to a number of seconds remaining for the pedestrian to cross the street. In some examples, the operable object 102 can be a medical device and the operable component 120 can be a valve, motor, pump, or other component of the medical device which actuates when the portable electronic device 100 emits a signal (e.g., through the wireless communication module 110). The operable component 120 can be communicatively coupled to the controller 118 such that the controller 118 can cause the operable component 120 to perform one or more actions.

In some examples, the operable component 120 can be a display, a control panel, or another component capable of receiving input within a vehicle (i.e., the operable object 102), such as, a vehicle configured for autonomous operation/transportation. For example, a first user of the vehicle can enter the vehicle and operate the vehicle using a first portable electronic device carried by the first user without physically touching the display. After the first user has left the vehicle, a new or second user can enter the vehicle and operate the vehicle using a second portable electronic device carried by the second user without physically touching the display. Thus, the multiple users (e.g., the first and second users) can control or otherwise operate the autonomous vehicle without physically touching or contacting the display of the vehicle, which may be have been compromised by a previous user of the vehicle. Additionally the present exemplary system reduces wear and increases the useable life of the operable component 120.

In some examples, the communication module 116 can transmit a first signal to the portable electronic device 100. The communication module 116 can continuously transmit the first signal or periodically transmit the first signal. The first signal can include information, such as, identification information which identifies the user or the portable electronic device 100 itself. The identification information can include a unique operable device identifier which permits the portable electronic device 100 to further communicate with the operable device 102. The identification information can include at least one of information related to a type of the operable device or a location of the operable device. For example, the type of the operable device could be an elevator control system and the location of the operable device could be an address or description of the location of an elevator within a building. In examples, the first signal can include information relating to at least one of a size, an appearance, or a position of an input element (e.g., input element 310) of a user interface (e.g., user interface 308) to be depicted by the portable electronic device 100.

Additionally, or alternatively, the communication module 110 of the portable electronic device 100 can transmit a second signal to the portable electronic device 100. The second signal can include instructions, for example, that instruct the controller 118 to cause the operable component 120 to perform an action based at least in part on the instructions. For example, the operable object 102 can be an automated teller machine and the second signal can include a unique user identifier. The instructions can cause the automated teller machine to conduct a transaction between the automated teller machine and the portable electronic device. The instructions can include information related to a monetary value of the transaction.

Figure 2:
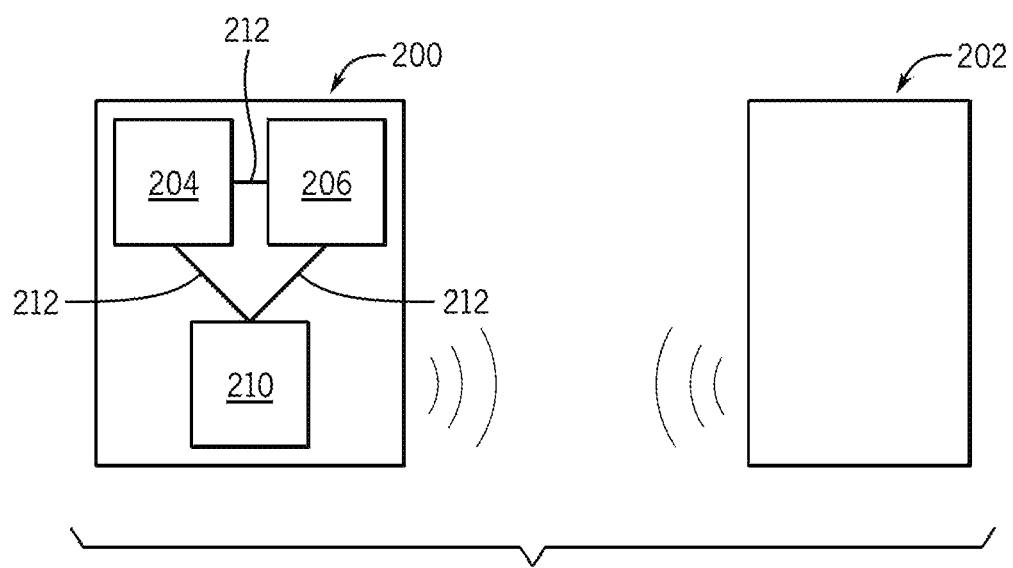
FIG. 2 shows a block diagram including a portable electronic device and an operable object.

FIG. 2 shows a block diagram including a portable electronic device 200 and an operable object 202. The portable electronic device 200 can include a display 204, a processor 206, and a wireless communication module 210. Each of the display 204, the processor 206, and the wireless communication module 210 can be operably connected through a communication path 212. The communication path 212 can be a wired or wireless communication path which electrically couples one or more components (e.g., the display 204, the processor 206, and the wireless communication module 210) within the portable electronic device 200. For example, the communication path 212 can be a serial bus that communicatively couples the components of the portable electronic device 200.

The display 204 can be substantially similar to, and can include some or all of, the features of the display 104. For example, the display 204 can be a touch screen display, or can have touch detecting capabilities, such as, capacitive touch, force touch, and near touch capabilities. The processor 206 can be substantially similar to, and can include some or all of, the features of the processor 106. For example, the processor 206 can include one or more computer processors or microcontrollers that perform operations in response to receiving computer-readable instructions. The wireless communication module 210 can be substantially similar to, and can include some or all of, the features of the wireless communication module 110. For example, the wireless communication module 210 can wirelessly transmit and/or receive data relative to the operable object 202.

In some examples, the wireless communication module 210 can be disposed within the portable electronic device 200. The wireless communication module 210 can detect a presence of the operable object 202 when the portable electronic device 200 is near or within a proximity of the operable object 202. For example, the operable object 202 can emit a signal (e.g., a radio wave) and an antenna within the wireless communication module 210 can detect or receive the signal. The signal emitted from the operable object 202 can be a radio wave having a frequency and magnitude which conforms to a wireless communication protocol, such as, Ultra Wideband (UWB), Bluetooth, Wi-Fi, Near-field Communication (NFC), or another wireless communication protocol. The operable object 202 can emit the signal intermittently or continuously. For example, the operable object 202 can emit the signal periodically throughout a duration of time, such as, emitting the signal every 2 second for a 10 hour duration of time. The period at which the signal is emitted can be any period between 1 millisecond and 1 hour. In some examples, the period can vary relative to an anticipated usage of the operable object 202. For example, the operable object 202 can be a pedestrian crossing system or a crosswalk system and the period at which the crosswalk system emits a signal may need to be more frequent (e.g., a smaller period) when the anticipated usage of the crosswalk system is higher, such as, when a sporting event is held at a venue adjacent the crosswalk system.

The wireless communication module 210 can detect the presence of the operable object 202 near the portable electronic device 200. The portable electronic device 200 can be disposed near the operable object 202 when a distance between the portable electronic device 200 and the operable object 202 is less than 1 meter, between about 1 meter to about 5 meters, between about 5 meters to about 25 meters, between about 25 meters to about 50 meters, or less than about 200 meters. In some examples, the portable electronic device 200 can be positioned within half a meter from the operable object 202 to cause the wireless communication module 210 to detect the presence of the operable object 202.

Any number or variety of components in any of the configurations described herein can be included in a portable electronic device. The components can include any combination of the features described herein, and can be arranged in any of the various configurations described herein. The structure and arrangement of components of a device, as well as the concepts regarding their use can apply not only to the specific examples discussed herein, but to any number of examples in any combination. Various examples of user input regions depicted on displays of portable electronic devices are described below, with reference to FIGS. 3A-3C.

Figure 3A:
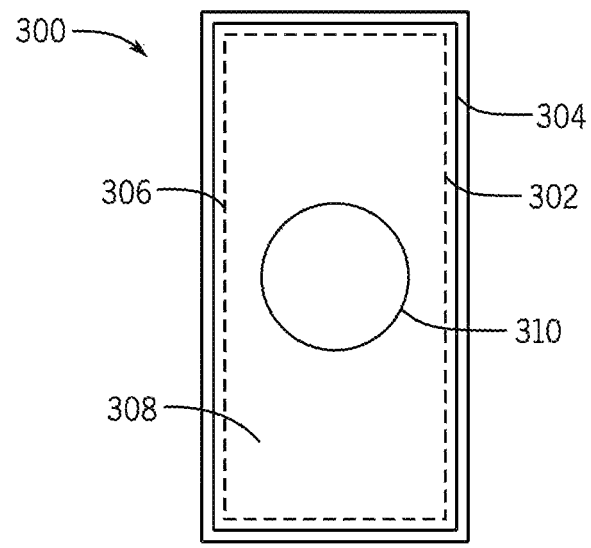
FIG. 3A shows a display of a portable electronic device.

FIG. 3A shows a portable electronic device 300 including a display 302 disposed within an enclosure 304. The display 302 can be substantially similar to, and can include some or all of, the features of the display 104. For example, the display 302 can be an LED display, an OLED display, an LCD display, or any other form of display now known in the art or as may be developed in the future. In some examples, the display 302 can be a touch screen display, or can have touch detecting capabilities, such as, capacitive touch, force touch, and near touch capabilities. For example, the display 302 can define a user input region 306 which can receive input from a user of the portable electronic device 300. The user input region 306 can include a user interface 308 which corresponds to an operable object, such as, an input component of the operable object. The display 302 can include one or more layers (e.g., a capacitive touch layer) and/or components, disposed within an internal volume defined by the enclosure 304 of the portable electronic device 300. The one or more layers and/or components can detect user input at or near the user input region 306.

The portable electronic device 300 can detect or otherwise identify an input at the user input region 306, such as, touch input, near-touch input, a sliding-touch input, other inputs, or combinations thereof. In some examples, the user interface 308 including an input element 310 of the user interface 308 can be depicted within the user input region 306. The user interface 308 can be any graphical user interface (GUI) or touchscreen GUI, form based interface, or menu driven interface configured to mimic or otherwise represent real-world inputs, buttons, screens, or other interfaces of the operable object. In some examples, the user interface 308 can include graphical representations that assume a shape, color, haptic response, and/or other characteristic of the real-world inputs. In some examples, the user interface 308 can include additional inputs and functionality not typically available to the physical or real-world interface of the operable object. As shown in FIG. 3A, the input element 310 of the user interface 308 can form a virtual button which can receive a touch input from a user of the portable electronic device 300. The input element 310 can resemble or otherwise correlate to an input component (e.g., the input component 114) of an operable object. For example, the input element 310 can resemble a button on a crosswalk system or a call button for an elevator system. When actuated (e.g., touched by a user), the input element 310 can cause the portable electronic device 300 to transmit a signal instructing one or more operable objects to perform an action. Additionally, the signal can be a first signal and a wireless communication module (e.g., wireless communication module 210) can receive a second signal from the operable object (e.g., operable object 202) causing the processor (e.g., processor 206) to perform an action based at least in part on the second signal. For example, the second signal can cause the portable electronic device 300 to output a message to a user of the portable electronic device 300.

Figure 3B:
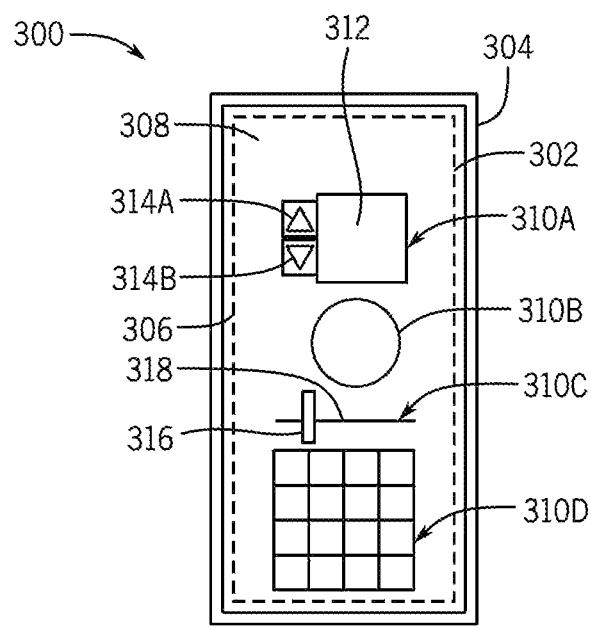
FIG. 3B shows a display of a portable electronic device.
Figure 3C:
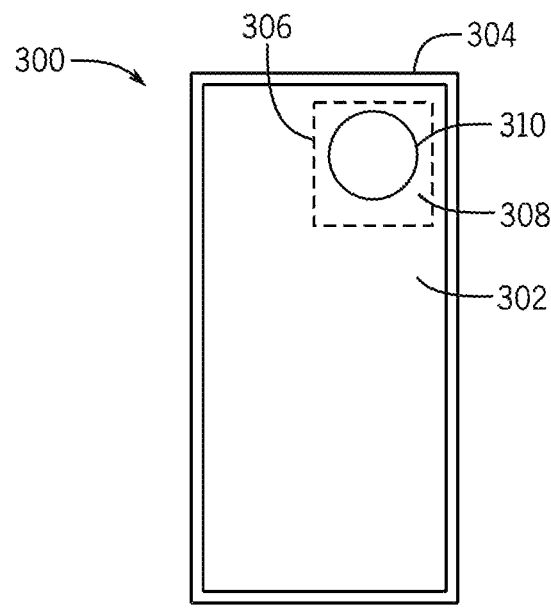
FIG. 3C shows a display of a portable electronic device.

In some examples, the user input region 306 can overlay a substantial majority of the display 302 (see FIGS. 3A and 3B) or overlay a portion of the display 302 (see FIG. 3C). While FIG. 3A only depicts a user interface 308 having a single input element 310, other examples of user interfaces can be formed of multiple input elements disposed about the user input region (see FIG. 3B). Moreover, the multiple input elements can vary in size, shape, and functionality. For example, the input element can include any graphically generated button, area, slider, lever, switch, knob, or other feature configured to receive input from a user to effect an action or input to the system. Other examples of user interfaces will be described in more detail below with reference to FIGS. 3B and 3C.

FIG. 3B shows the portable electronic device 300 including the display 302 disposed within the enclosure 304. As shown in FIG. 3B, the display 302 can depict the user interface 308 within the user input region 306 and can include multiple input elements 310A, 310B, 310C, 310D. While each of the input elements 310A, 310B, 310C, 310D depicted in FIG. 3B are unique, the user interface 308 can additionally, or alternatively, include multiple input elements which are duplicative (e.g., two or more of the same type of input element). Additionally, although a specific number of input elements 310A, 310B, 310C, 310D are shown, the user interface 308 can include any number of input elements, and can include variable numbers and sizes of input elements. In some examples, the number, size, shape, and/or configuration of the input elements can be controlled by a user and/or automatically adjusted, as desired. In other examples, the number, size, shape, and/or configuration of the input elements can be controlled by the operable object and can be communicated to the portable electronic device 300 via the emitted signal.

The input element 310A is an example input element which includes a sub-display 312 and toggle arrows 314A, 314B. The sub-display 312 can display content, such as, content related to the operable object. For example, if a pedestrian crossing system is the operable object, the sub-display 312 can depict a numerical countdown sequence related to an amount of time the user has to cross the street. The toggle arrows 314A, 314B can be used to manipulate or alter the value depicted on the sub-display 312. For example, a user can actuate the toggle arrow 314A to increase a value depicted on the sub-display 312, while actuation of the toggle arrow 314B can decrease the value depicted on the sub-display 312. The input element 310B can resemble a button which can receive a touch input from a user of the portable electronic device 300, for example, a button that sends the information from the user interface to the operable object. The input element 310C can receive a sliding input or a touch input which displaces a block 316 along a spectrum 318 representing a range of values. For example, the user can vary a position of the block 316 along the spectrum 318 to vary a volume level of an alert emitted by the portable electronic device 300. The input element 310D can form a number pad or an alphanumeric keyboard to receive input from the user of the portable electronic device 300.

The input elements 310A, 310B, 310C, 310D described herein are merely given as examples of possible input elements that can be utilized to form the user interface 308.

As such, the examples of input elements shown in the figures and described herein should not be considered as limiting the scope of input elements contemplated within this disclosure. Each of the input elements 310A, 310B, 310C, 310D that form the user interface 308 can receive input from a user that can be used to form instructions transmitted to an operable object. In some examples, at least a portion of the input elements 310A, 310B, 310C, 310D can resemble a corresponding button or other input component of the operable object. For example, the input element 310D can look like, or substantially resemble, a keypad of an ATM. In some examples, one or more of the input elements 310A, 310B, 310C, 310D that form the user interface 308 can be unique to the user interface 308 (i.e., not present on the operable object), and can therefore enable a user to control additional aspects or functionality of the operable object above the functionality offered by the input component of the operable object. For example, the input element 310A can allow a user to designate an amount of time desired to cross a street on a crosswalk and can communicate that time to the pedestrian crossing system, while the standard physical button on the pedestrian crossing system does not enable a user to select an amount of time needed to cross. After the user has selected a desired value using the toggle arrows 314A, 314B, instructions can be generated and transmitted from the portable electronic device 300 to the crosswalk control system (e.g., the operable object) which operates pursuant to the instructions.

FIG. 3C shows the portable electronic device 300 including the display 302 disposed within the enclosure 304. As shown in FIG. 3C, in some examples, the user input region 306 and the user interface 308 can occupy only a portion of the display 302, and in some examples a substantial minority of the display 302, so as to limit a quantity of the display 302 that is obstructed by the user interface 308. For example, the user interface 308 can be generated at a top corner of the display 302 (as shown in FIG. 3C) when the portable electronic device 300 detects an operable object near the portable electronic device 300. While the input elements 310A-310D receive a touch input or near-touch input, the portable electronic device 300 can additionally, or alternatively, receive input through voice input, gesture recognition, or other forms of inputting information into the portable electronic device 300.

Any number or variety of components in any of the configurations described herein can be included in a portable electronic device, as described herein. The components can include any combination of the features described herein, and can be arranged in any of the various configurations described herein. The structure and arrangement of components of a device, as well as the concepts regarding their use, can apply not only to the specific examples discussed herein, but to any number of examples in any combination. An example of supplementing an input component of an operable object, like a pedestrian crossing system (i.e., a crosswalk system), using a portable electronic device is described below, with reference to FIGS. 4A-4C.

Figure 4A:
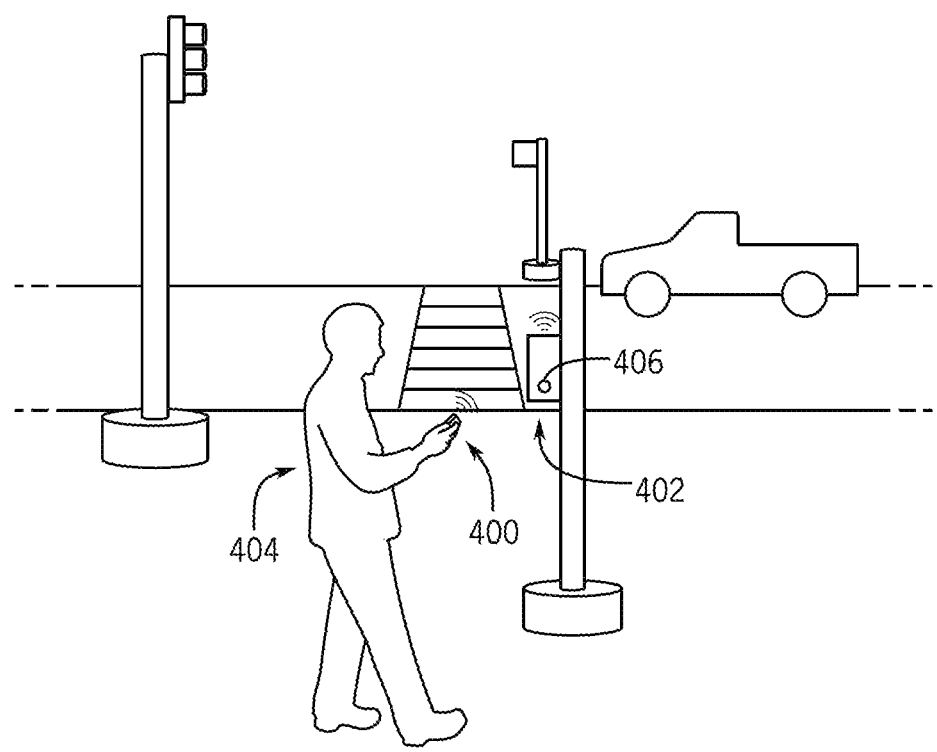
FIG. 4A shows a person using a portable electronic device.

FIG. 4A shows an example environment in which a portable electronic device 400 can be utilized to supplement control over an operable object (e.g., a crosswalk system interface 402) to allow a user 404 to utilize the operable object without physically touching the operable object. The portable electronic device 400 can be substantially similar to, and can include some or all of the features of, the portable electronic devices 100, 200, 300. For example, the portable electronic device 400 can include a display, a processor, one or more sensors, and a wireless communication module, as previously described herein. The crosswalk system interface 402 can be substantially similar to, and can include some or all of the features of the operable objects 102, 202. For example, the crosswalk system interface 402 can include an input component 406 and communication module, as previously described herein. In some examples, the input component 406 can receive physical input (touch, force, etc.) such that the input component 406 can be an analog or physical input component. For example, the analog input component or physical input component can include any physically actuated input mechanism including, but in no way limited to, a physical button, a touchscreen button, a keypad, a toggle, a switch, a lever, a knob, a dial, a slider, and/or a pedal. Furthermore, the portable electronic device 400 can include one or more haptic motors, speakers, and coordinated electronics to further enhance the user experience in simulating the physical input component. For example, if the physical input component 406 is a button represented and displayed by the portable electronic device 400, when actuated on the electronic device, the electronic device can simulate a depression and actuation of the physical input component 406 with the generation of an associated sound and/or haptic response.

As the user 404 approaches the input component 406, the portable electronic device 400 can detect the presence of the crosswalk system interface 402 and generate a user input region on the portable electronic device 400. In some examples, a communication link can be established between the portable electronic device 400 and the crosswalk system interface 402. For example, a communication link can be established between the wireless communication module of the portable electronic device 400 and the communication module of the crosswalk system interface 402. Information relative to the crosswalk system interface 402 can be supplied by the crosswalk system interface 402 and downloaded onto the portable electronic device 400 through the communication link, for example, when the presence of the crosswalk system interface 402 is detected by the portable electronic device 400.

In some examples, the downloaded information can relate to a configuration or a layout of a user interface, and one or more input elements generated on the display of the portable electronic device 400. More specifically, the user input region can form the user interface which includes the one or more input elements. The size, shape, appearance, position, or other characteristic of each of the input elements can be dictated by the downloaded information. In other words, a characteristic of an input element of the user input region correlates to the information. The user interface and the one or more input elements can supplement the functionality of the input component 406 of the crosswalk system interface 402. The portable electronic device 400 can receive input at the user input region, such as by the user 404 touching the input element of the user interface. After receiving an input at the user input region, the portable electronic device 400 can transmit a signal that is received by the crosswalk system interface 402 instructing the crosswalk system interface to perform an action based at least in part on the input at the user input region. For example, the crosswalk system interface 402 can receive the signal and consequently implement a crossing procedure (i.e., activate a countdown timer for the user 404 to cross the street) based, at least in part, on the signal received from the portable electronic device 400.

In some examples, one or more of the input elements can resemble the input component 406 to enable the user 404 to correlate the user interface with the crosswalk system interface 402. The user input region, the user interface, and the one or more input elements will be discussed in greater detail below with reference to FIG. 4B.

Figure 4B:
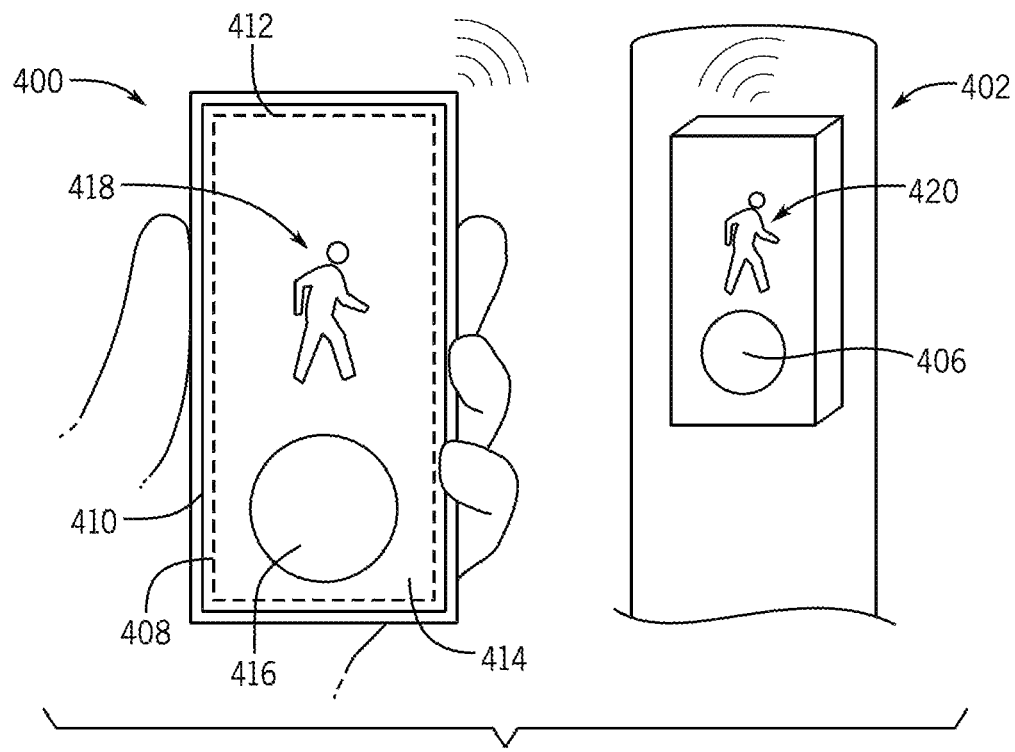
FIG. 4B shows a perspective view of an operable object and the portable electronic device of FIG. 4A.

FIG. 4B shows the portable electronic device 400 including a display 408 disposed within an enclosure 410. The display 408 can be substantially similar to, and can include some or all of, the features of the display 104, 204, 302. For example, the display 408 can be an LED display, an OLED display, an LCD display, or any other form of display now known in the art, or as may be developed in the future. In some examples, the display 408 can be a touch screen display, or can have touch detecting capabilities, such as, capacitive touch, force touch, and near touch capabilities. For example, the display 408 can define a user input region 412 which can receive input from a user of the portable electronic device 400. The display 408 can include one or more layers (e.g., a capacitive touch layer) and/or components, disposed within an internal volume defined by the enclosure 410 of the portable electronic device 400. The one or more layers and/or components can detect user input at or near the user input region 412.

As shown in FIG. 4B, the user input region 412 can include user interface 414 including an input element 416. The user interface 414 and/or the input element 416 can substantially resemble the input component 406 and/or the crosswalk system interface 402. For example, a symbol 418 can be depicted on the display 408 which substantially resembles a symbol 420 on the crosswalk system interface 402. The input element 416 of the user interface 414 can form a virtual button which can receive a touch input from a user of the portable electronic device 400. When actuated (e.g., touched by a user), the input element 416 can cause the portable electronic device 400 to transmit a signal instructing the crosswalk system interface 402 to implement the crossing sequence (i.e., stop through traffic by changing the traffic signal and starting a countdown sequence for the pedestrian to cross).

The input element 416 can supplement the input component 406 to enable the user 404 to utilize the crosswalk system interface 402 without having to physically touch the input component 406 which may be touched by thousands of users each day. In other words, the user 404 can interface with the portable electronic device 400 to actuate the crosswalk system interface 402 instead of having to touch a potentially unclean or hazardous surface of the input component 406. By supplementing the input component 406 using the portable electronic device 400, the user 404 can be less likely to come into contact with and spread hazardous pathogens, such as, viruses, bacteria, and other potentially hazardous microscopic organisms.

Figure 4C:
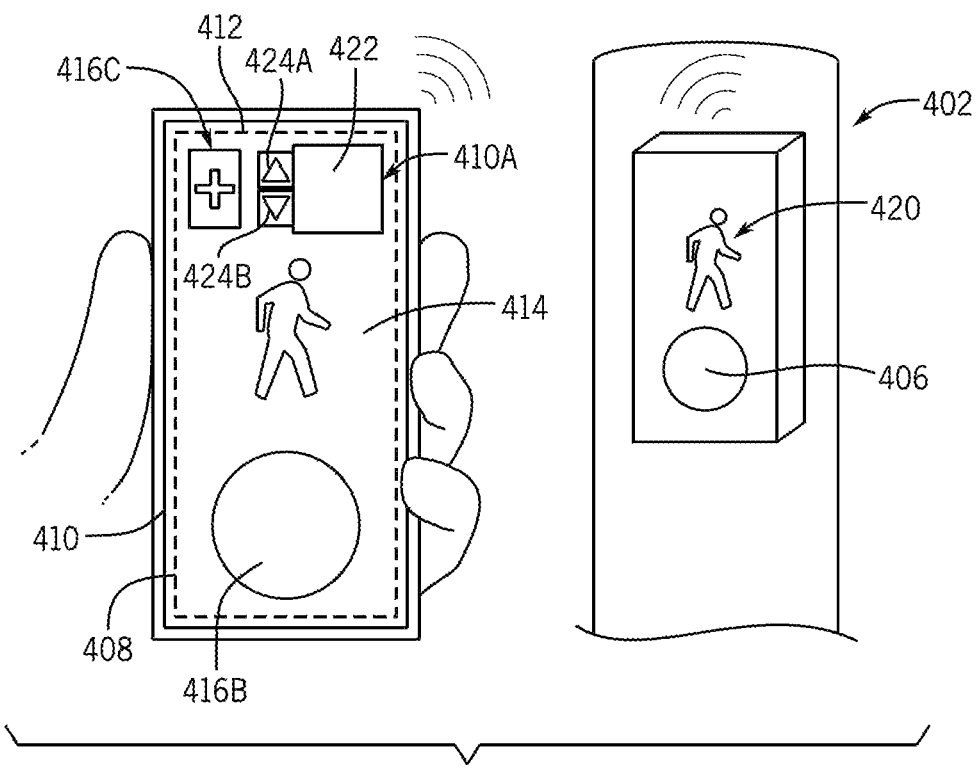
FIG. 4C shows a perspective view of an operable object and the portable electronic device of FIG. 4A.

FIG. 4C shows another example of the user input region 412 including the user interface 414 having multiple input elements 416A, 416B, 416C. In some examples, one or more of the multiple input elements 416A, 416B, 416C can provide additional functionality that goes beyond the functionality of the input component 406. For example, one or more of the input elements 416A, 416B, 416C can vary the duration of time the user 404 is given to cross the street, contact emergency personnel, report a malfunction, or any other functionality beyond actuating the input component 406. The input element 416A can be substantially similar to the input element 310A and can include a sub-display 422 and toggle arrows 424A, 424B. The sub-display 422 can display content, such as, content related to the crosswalk system interface 402. For example, the sub-display 422 can depict a numerical countdown sequence related to an amount of time the user 404 has to cross the street. The toggle arrows 424A, 424B can be used to manipulate or alter the numerical value depicted on the sub-display 422. For example, a user can actuate the toggle arrow 424A to increase a numerical value depicted on the sub-display 422 and thereby increase the amount of time the user 404 can use to cross the street. Alternatively, the toggle arrow 424B can decrease the numerical value depicted on the sub-display 422. The input element 416B can resemble a button which can receive a touch input from a user of the portable electronic device 400.

The input element 416C can receive a touch input that causes the portable electronic device 400 to contact or send a notification to emergency response personnel, such as, firefighters, emergency medical technicians (EMTs), police officers, etc. For example, the user 404 can touch the input element 416C as a result of a car crash or injury to a pedestrian. While the user interface 414 depicted in FIG. 4C only shows a few example input elements, persons having ordinary skill in the art will readily appreciate that other types of input elements having one or more functions can be presented on the user interface 414. For example, the user interface can include an input element that notifies a utility that a traffic light or other component of a crossing system has malfunctioned or is inoperable.

In some examples, the portable electronic device 400 can generate a status indicator or other alert to inform the user 404 of a status of the operable object. For example, the status indicator can be generated on the display 408 and depict a countdown clock. The status indicator can be representative of an action undertaken by the operable object in response to operational instructions transmitted to the operable object from the portable electronic device 400. Additionally, or alternatively, the portable electronic device 400 can include an audio component which generates an audible alert correlating to an action of the operable object. For example, the audio component can generate an audible alert that warns the user 404 that less than 10 seconds remain to cross the street.

Any number or variety of components in any of the configurations described herein can be included in a portable electronic device, as described herein. The components can include any combination of the features described herein, and can be arranged in any of the various configurations described herein. The structure and arrangement of components of a device, as well as the concepts regarding their use can apply not only to the specific examples discussed herein, but to any number of examples in any combination. Various examples of supplementing an input component of an operable object using a portable electronic device is described below, with reference to FIGS. 5-8.

Figure 5:
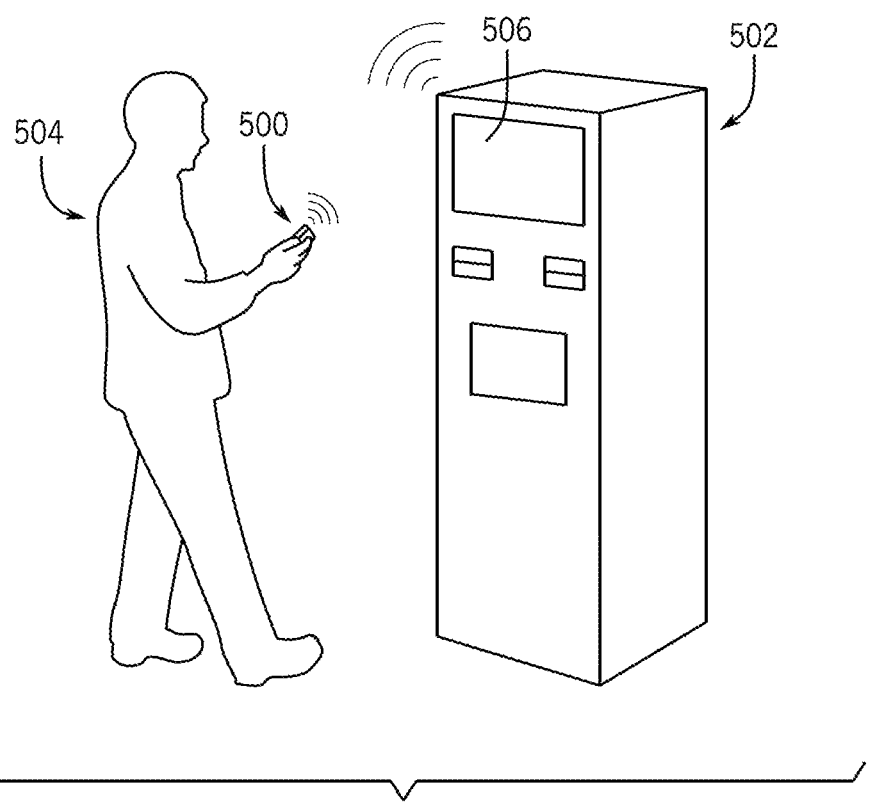
FIG. 5 shows a person using a portable electronic device.

FIG. 5 shows an example environment in which a portable electronic device 500 is being utilized to supplement control over an operable object (e.g., an ATM 502) to allow a user 504 to utilize the operable object without physically touching the operable object. Enabling the user 504 to interface with the ATM 502 through the portable electronic device 500 can be beneficial in eliminating the possibility of card skimming and other forms of theft related to physically inserting a credit or debit card into the ATM 502. Moreover, the user 504 can be less likely to come into contact with, and potentially spread, hazardous pathogens, such as, viruses, bacteria, and other potentially hazardous microscopic organisms disposed on an input component 506 of the ATM 502 by supplementing the input component 506 with the portable electronic device 500.

The portable electronic device 500 can be substantially similar to, and can include some or all of the features of the portable electronic devices 100, 200, 300, 400. For example, the portable electronic device 500 can include a display, a processor, one or more sensors, and a wireless communication module, as previously described herein. The ATM 502 can be substantially similar to, and can include some or all of the features of the operable objects 102, 202. For example, the ATM 502 can include one or more input components 506 and a communication module, as previously described herein.

As the user 504 approaches the input component 506, the portable electronic device 500 can detect the presence of the ATM 502 and can generate a user input region on the portable electronic device 500. In some examples, a communication link can be established between the portable electronic device 500 and the ATM 502. For example, a communication link can be established between the wireless communication module of the portable electronic device 500 and the communication module of the ATM 502. Information relative to the ATM 502 can be supplied by the ATM 502 and downloaded onto the portable electronic device 500 through the communication link when the presence of the ATM 502 is detected by the portable electronic device 500. For example, the quantity and types of input elements depicted on a user interface of the input region can be at least partially based on the information transferred from the ATM 502.

The user input region can receive input from the user 504 to direct a task or action undertaken by the ATM 502. For example, the user 504 can input a personal pin, an account number, or other criteria at the user input region to gain access to the ATM 502. In some examples, the user input region can depict the user interface having default information, such as, a quantity of currency withdrawn by the user 504 during a previous exchange. The portable electronic device 500 can generate and transmit operational instructions to the ATM 502 based at least in part on the user input at the user input region. The operational instructions can cause the ATM 502 to perform a task or action, such as, withdrawing a desired amount of currency or checking an account balance. In some examples, the operational instructions can include a signal that identifies the portable electronic device 500 and thereby permits the user to access secure information and withdraw currency from the ATM 502.

Figure 6:
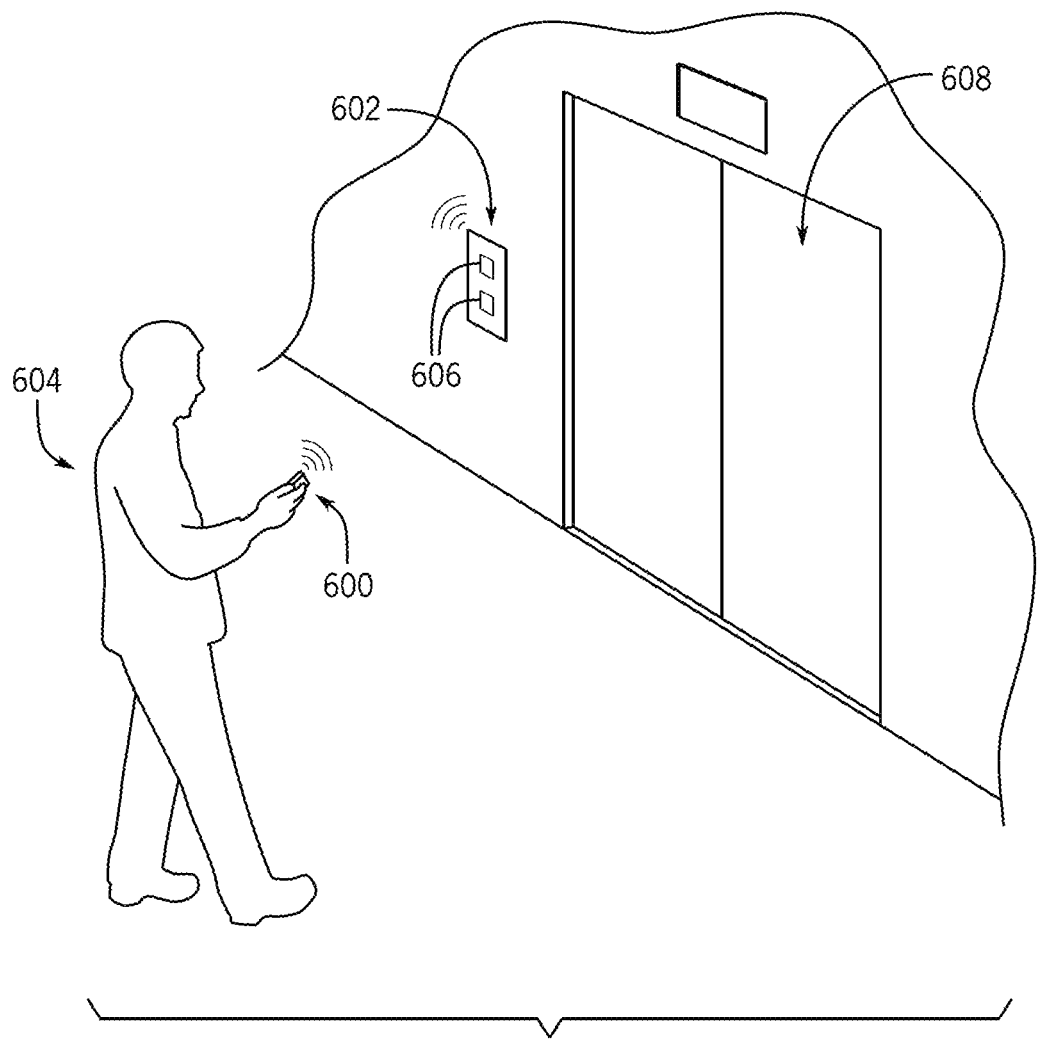
FIG. 6 shows a person using a portable electronic device.

FIG. 6 shows an example environment in which a portable electronic device 600 is being utilized to supplement control over an operable object (e.g., an elevator control system 602) to allow a user 604 to utilize the operable object without physically touching an input component 606 (e.g., a call button) of the operable object. Enabling the user 604 to interface with the elevator control system 602 through the portable electronic device 600 can be beneficial because the user 604 is less likely to come into contact with, and to potentially spread, hazardous pathogens, such as, viruses, bacteria, and other potentially hazardous microscopic organisms disposed on the input component 606 of the elevator control system 602 by supplementing the input component 606 with the portable electronic device 600.

The portable electronic device 600 can be substantially similar to, and can include some or all of the features of the portable electronic devices 100, 200, 300, 400, 500. For example, the portable electronic device 600 can include a display, a processor, one or more sensors, and a wireless communication module, as previously described herein. The elevator control system 602 can be substantially similar to, and can include some or all of the features of the operable objects 102, 202. For example, the elevator control system 602 can include one or more input components 606 (e.g., call buttons and other buttons within an elevator 608) and a communication module, as previously described herein.

As the user 604 approaches the input component 606, the portable electronic device 600 can detect the presence of the input component 606 and/or the elevator control system 602, and can generate a user input region on the portable electronic device 600. In some examples, a communication link can be established between the portable electronic device 600 and the elevator control system 602. For example, a communication link can be established between the wireless communication module of the portable electronic device 600 and the communication module of the elevator control system 602. Information relative to the elevator control system 602 can be supplied by the elevator control system 602 and downloaded onto the portable electronic device 600 through the communication link when the presence of the input component 606 and/or the elevator control system 602 is detected by the portable electronic device 600. For example, the quantity and types of input elements depicted on a user interface of the input region can be at least partially based on the information transferred from the elevator control system 602. In some examples, the user interface can resemble a control panel of the elevator 608 having buttons correlating to each floor; buttons for opening and closing the doors; and a button to call in emergency personnel.

The user input region can receive input from the user 604 to direct a task or an action traditionally undertaken by the elevator control system 602. For example, the user 604 can call the elevator 608 or input a desired floor the user 604 wishes to exit the elevator 608. In some examples, the user input region can depict the user interface having default or predictive information, such as, a floor the user 604 selects most frequently (e.g., the floor on which the user 604 resides). The portable electronic device 600 can generate and transmit operational instructions to the elevator control system 602 based at least in part on the user input at the user input region. The operational instructions can cause the elevator control system 602 to perform a task or an action, such as, to stop at a particular floor or to call the elevator 608 to a particular floor. In some examples, the operational instructions can include a signal that identifies the portable electronic device 600 and thereby permits the user 604 to access a secure floor (i.e., a floor that only a select group of individuals may access).

Figure 7:
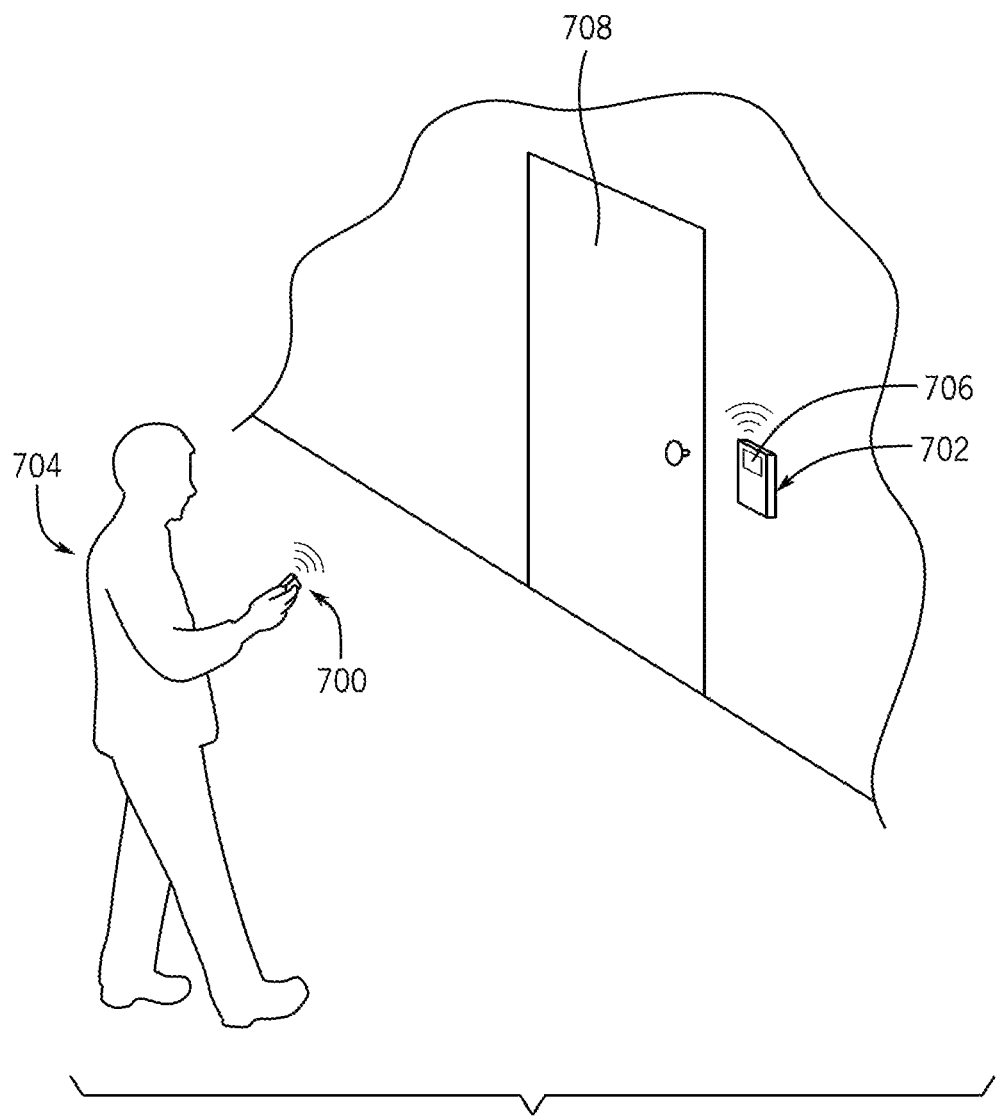
FIG. 7 shows a person using a portable electronic device.

FIG. 7 shows an example environment in which a portable electronic device 700 is being utilized to supplement control over an operable object (e.g., a door access control system 702) to allow a user 704 to open a secured door 708 without physically touching an input component 706 (e.g., a touch pad, a number pad, an RFID reader, or other input mechanism) of the door access control system 702. Enabling the user 704 to interface with the input component 706 through the portable electronic device 700 can be beneficial because the user 704 is less likely to come into contact with, and to potentially spread, hazardous pathogens, such as, viruses, bacteria, and other potentially hazardous microscopic organisms disposed on the input component 706 of the door access control system 702 by supplementing the input component 706 with the portable electronic device 700.

The portable electronic device 700 can be substantially similar to, and can include some or all of the features of the portable electronic devices 100, 200, 300, 400, 500, 600. For example, the portable electronic device 700 can include a display, a processor, one or more sensors, and a wireless communication module, as previously described herein. The door access control system 702 can be substantially similar to, and can include some or all of the features of the operable objects 102, 202. For example, the door access control system 702 can include one or more input components 706 (e.g., touch pads, number pads, RFID readers, or other input mechanisms) and a communication module, as previously described herein.

As the user 704 approaches the input component 706, the portable electronic device 700 can detect the presence of the input component 706 and/or the door access control system 702, and it can generate a user input region on the portable electronic device 700. In some examples, a communication link can be established between the portable electronic device 700 and the door access control system 702. For example, a communication link can be established between the wireless communication module of the portable electronic device 700 and the communication module of the door access control system 702. Information relative to the door access control system 702 can be supplied by the door access control system 702 and downloaded onto the portable electronic device 700 through the communication link when the presence of the input component 706 and/or the door access control system 702 is detected by the portable electronic device 700. For example, the quantity and types of input elements depicted on a user interface of the input region can be at least partially based on the information transferred from the door access control system 702.

The user input region can receive input from the user 704 to direct a task or an action typically undertaken by the door access control system 702. For example, the user 604 can gain access to the secured door 708; limit or modify access for other persons; prevent the secured door from being opened or unlocked for a duration of time; etc. The portable electronic device 700 can generate and transmit operational instructions to the door access control system 702 based, at least in part, on the user input at the user input region. The operational instructions can cause the door access control system 702 to perform a task or action, such as, unlocking the secured door 708, to provide access to the user 704. In some examples, the operational instructions can include a signal that identifies the portable electronic device 700. Additionally, or alternatively, the door access control system 702 can require the user 704 to input a pin or a password on the input region of the portable electronic device 700 to open or unlock the secured door 708. The door access control system 702 can include or otherwise be communicatively coupled to a memory including a database. The door access control system 702 can compare credentials provided by the user 704 (e.g., pin, password, identity of the portable electronic device 700, other credentials, or a combination thereof) to credentials stored on the database to determine whether to provide access to the user 704.

Figure 8:
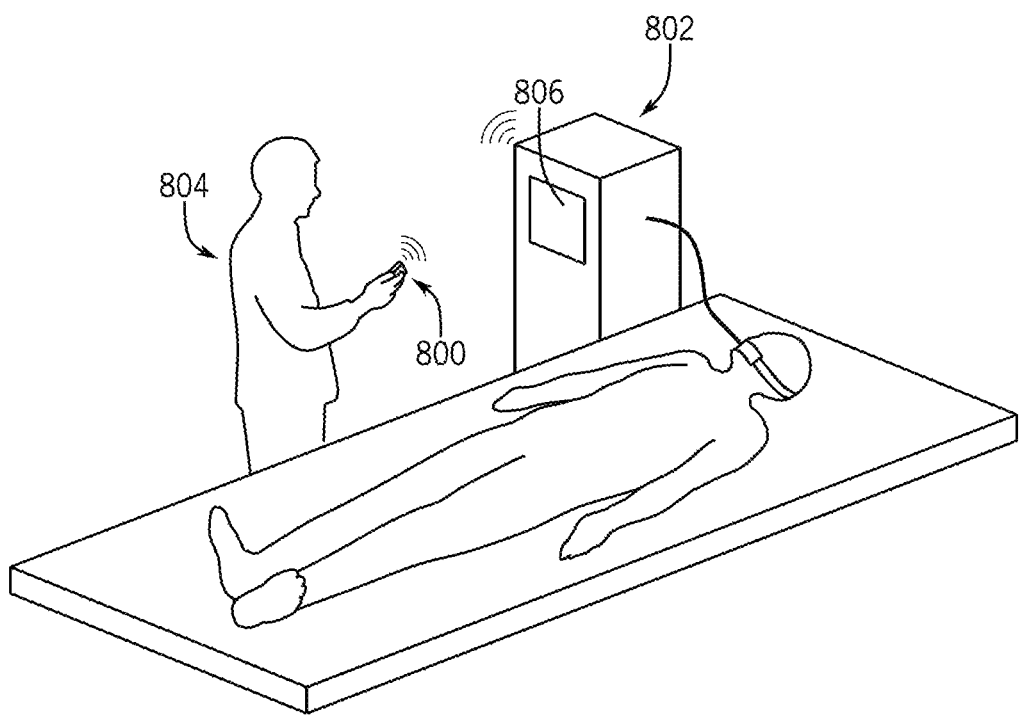
FIG. 8 shows a person using a portable electronic device.

FIG. 8 shows an example environment in which a portable electronic device 800 is being utilized to supplement control of an operable object (e.g., a medical device 802 such as a ventilator, a monitoring device, or other medical device) to allow a medical professional 804 (e.g., a nurse, a doctor, or other medical professional) to utilize the operable object without physically touching the operable object. Enabling the medical professional 804 to interface with an input component 806 of the medical device 802 through the portable electronic device 800 can be beneficial because the medical professional 804 can be less likely to come into contact with, and potentially spread, hazardous pathogens, such as, viruses, bacteria, and other potentially hazardous microscopic organisms disposed on the input component 806 of the medical device 802 by supplementing the input component 806 with the portable electronic device 800.

The portable electronic device 800 can be substantially similar to, and can include some or all of, the features of the portable electronic devices 100, 200, 300, 400, 500, 600, 700. For example, the portable electronic device 800 can include a display, a processor, one or more sensors, and a wireless communication module, as previously described herein. The medical device 802 can be substantially similar to, and include some or all of the features of the operable objects 102, 202. For example, the medical device 802 can include one or more input components 806 and a communication module, as previously described herein.

As the medical professional 804 approaches the medical device 802, the portable electronic device 800 can detect the presence of the medical device 802 and generate a user input region on the portable electronic device 800. In some examples, a communication link can be established between the portable electronic device 800 and the medical device 802. For example, a communication link can be established between the wireless communication module of the portable electronic device 800 and the communication module of the medical device 802. Information relative to the medical device 802 can be supplied by the medical device 802 and downloaded onto the portable electronic device 800 through the communication link when the presence of the medical device 802 is detected by the portable electronic device 800. For example, the quantity and types of input elements depicted on a user interface of the input region can be at least partially based on the information transferred from the medical device 802.

The user input region can receive input from the medical professional 804 to direct a task or action undertaken by the medical device 802. For example, if the medical device 802 is a ventilator, the medical professional 804 can input a desired mode of operation for the ventilator such as, pressure support (PS), synchronized intermittent mandatory ventilation (SIMV), airway pressure release ventilation (APRV), or another mode of operation. In examples, the user input region can depict the user interface having default information, such as, an operational mode that is most frequently used. The portable electronic device 800 can generate and transmit operational instructions to the medical device 802 based, at least in part, on the medical professional's input at the user input region. The operational instructions can cause the medical device 802 to perform a task or action, such as, changing a mode of operation, going into a standby mode, altering the information depicted on a display screen of the medical device 802, or another task or action. In some examples, the operational instructions can include a signal that identifies the portable electronic device 800, and thereby permits the medical professional 804 to gain access to modify or alter operational aspects of the medical device 802.

Any number or variety of components in any of the configurations described herein can be included in a portable electronic device, as described herein. The components can include any combination of the features described herein, and can be arranged in any of the various configurations described herein. The structure and arrangement of components of a device, as well as the concepts regarding their use, can apply not only to the specific examples discussed herein, but to any number of examples in any combination. An example flow diagram of a method for supplementing an input component of an operable device using a portable electronic device is described below, with reference to FIG. 9.

Figure 9:
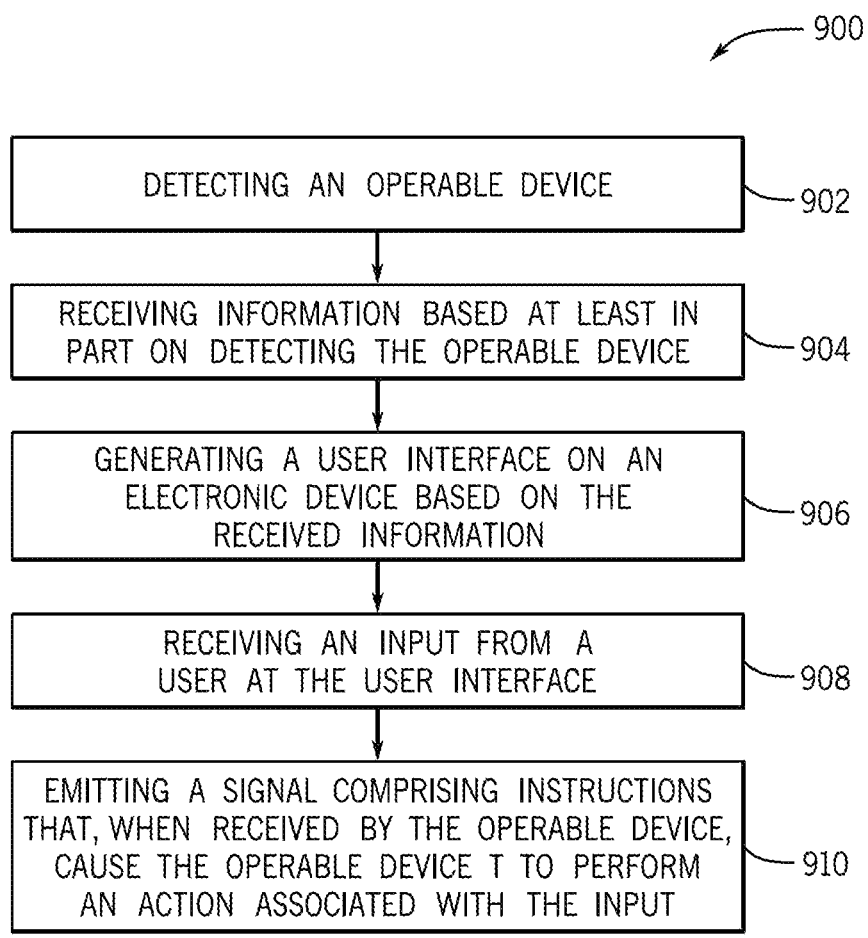
FIG. 9 shows a process flow diagram.

FIG. 9 shows a flow diagram of a method 900 for supplementing an input component of an operable device.

The method 900 can include detecting an operable device 902, receiving information based at least in part on detecting the operable device 904, generating a user interface on an electrical device based on the received information 906 receiving an input from a user at the user interface 908, and emitting a signal including instructions that, when received by the operable device, cause the operable device to perform an action associated with the input 910. The terms operable object and operable device can be used interchangeably herein, as such, the operable device can be substantially similar to and can include some or all of the features of other operable objects disclosed herein (e.g., operable object 102, 202, 402, 502, 602, 702, 802).

As noted above, the method 900 can include the act of detecting an operable device 902. The operable device can be detected, for example, by a portable electronic device. In some examples, the portable electronic device can include one or more sensors which detect the presence of the operable device using computer vision or image recognition techniques. The one or more sensors can be one or more cameras which capture a still or live image of the operable device to detect the operable device. For example, a user of the portable electronic device can position a portion of the operable device within the scope of the camera lens to detect the operable device.

In some examples, the one or more sensors can detect a presence of the operable device when the portable electronic device is near or within a proximity of the operable device by detecting a signal emitted from the operable device. The signal emitted from the operable device can be a radio wave having a frequency and magnitude which conforms to a wireless communication protocol, such as, Ultra Wideband (UWB), Bluetooth, Wi-Fi, Near-field Communication (NFC), or another wireless communication protocol. Alternatively, or additionally, the portable electronic device can include wireless communication components which receive the signal emitted by the operable device to detect the presence of the operable device. According to one example, the portable electronic device can incorporate directional wireless communication protocols that allow for directional sensing of a signal, such as using UWB wireless communication protocols. According to this example, a user can directionally aim the electronic device towards the operable device, and if the operable device is transmitting an appropriate signal, a communications handshake or connection can occur. This directional detection can eliminate random, incessant, multiple, or unexpected detections of an operable device. Furthermore, the directional detection of an operable device can provide the user with control over which operable device is being communicated with in an environment where multiple operable devices might be present, such as at a busy intersection or a bank of multiple elevators. Additionally or alternatively, the present detection of an operable device can be limited to situations where a dedicated application is open and/or running on the portable electronic device.

The method 900 can further include the act of receiving information based at least in part on detecting the operable device 904. The information can at least partially relate to a functionality, visual appearance, operability, location, and/or other aspect of the operable device. For example, the information can contain data related to the appearance and layout of an input component of the operable device which can receive at least one input to cause the operable device to perform an action or a task (e.g., an elevator call button which summons the elevator to a particular floor). In some examples, the information can include data related to an operability status of the operable device, such as, whether the device is currently inoperable due to a malfunction or a scheduled maintenance. The information can be transmitted from the operable device itself and/or from another source (e.g., a server at a datacenter disposed at a separate location than the operable device).

The method 900 can further include the act of generating a user interface on an electrical device based on the received information 906. The electrical device can be substantially similar to, and can include some or all of, the features of the portable electronic devices disclosed herein (e.g., portable electronic device 100, 200, 300 400, 500, 600, 700, 800). The user interface can be substantially similar to, and can include some or all of, the features of the user interfaces disclosed herein (e.g., user interfaces 308, 414). For example, the user interface can include one or more input elements to receive input from a user of the electrical device. The input elements can include one or more buttons, switches, toggles, levers, knobs, touch-screens, other input components, or combinations thereof. In some examples, the user interface can resemble an interface of the operable device (e.g., elevator control panel, a crosswalk system button, etc.).

The method 900 can include the act of receiving an input from a user at the user interface 908. The user interface can be depicted on a display of the electrical device and the display can include any technology now know or otherwise developed for receiving input from a user at the user interface. For example, the display can include one or more layers capable of receiving a touch input, a sliding-touch input, a near-touch input, another type of input, or a combination thereof. Additionally, or alternatively, the electrical device can include an audio component (e.g., a microphone) such that a voice input is receivable by the electrical device. In some examples, the electrical device can include one or more cameras such that a gesture input receivable by the electrical device.

The method 900 can also include the act of emitting a signal including instructions that, when received by the operable device, cause the operable device to perform an action associated with the input 910. The signal can be emitted by the electrical device, for example, by a wireless communication module disposed within the electrical device. The wireless communication module can wirelessly transmit and/or receive data relative to the operable device. For example, the wireless communication module can include one or more wireless antenna systems, such as WIFI, Bluetooth, UWB, cellular, LTE, 5G, GPS, or any other form of wireless antenna system. These systems can facilitate wireless communication with other devices (e.g., the operable device). Each of the one or more wireless antenna systems can transmit and/or receive wireless signals at one or more frequencies.

The signal can be received by a communication module within the operable device. The communication module can include one or more antennas and controllers which enable wireless communication between the operable device and another device (e.g., the electrical device). In other words, the communication module can transmit and/or receive signals (e.g., radio waves) from devices. Accordingly, the communication module can include one or more wireless antenna systems, such as WIFI, Bluetooth, UWB, cellular, LTE, 5G, GPS, or any other form of wireless antenna system. For example, the communication module can receive or detect signals transmitted by the electrical device instructing the operable device to perform an action or task associated with the input. The action or task can be at least partially associated with the input from the user at the user interface. For example, the action can be at least partially related to at least one of a parameter, a pin, a numerical value, a duration of time, a mode of operation, a setting, or a combination thereof that was input into the user interface by the user.

As used herein, and in the appended claims, the phrase "at least one of A, B, or C," where A, B, C can be independent elements, conditions, events, or other objects, is satisfied by the following circumstances: the presence or occurrence of A without the presence or occurrence of B and C; the presence or occurrence of B without the presence or occurrence of A and C; the presence or occurrence of C without the presence or occurrence of A and C; the presence or occurrence of A and B without the presence or occurrence of C; the presence or occurrence of A and C without the presence or occurrence of B; the presence or occurrence of B and C without the presence of occurrence of A; or the presence or occurrence of A, B, and C.

To the extent applicable to the present technology, gathering and use of data available from various sources can be used to improve the delivery to users of invitational content or any other content that may be of interest to them. The present disclosure contemplates that in some instances, this gathered data may include personal information data that uniquely identifies or can be used to contact or locate a specific person. Such personal information data can include demographic data, location-based data, telephone numbers, email addresses, TWITTER® ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to deliver targeted content that is of greater interest to the user. Accordingly, use of such personal information data enables users to calculated control of the delivered content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates examples in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services or anytime thereafter. In another example, users can select not to provide mood-associated data for targeted content delivery services. In yet another example, users can select to limit the length of time mood-associated data is maintained or entirely prohibit the development of a baseline mood profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed examples, the present disclosure also contemplates that the various examples can also be implemented without the need for accessing such personal information data. That is, the various examples of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

The foregoing description, for purposes of explanation, used specific nomenclature to provide a thorough understanding of the described examples. However, it will be apparent to one skilled in the art that the specific details are not required in order to practice the described examples. Thus, the foregoing descriptions of the specific examples described herein are presented for purposes of illustration and description. They are not target to be exhaustive or to limit the examples to the precise forms disclosed. It will be apparent to one of ordinary skill in the art that many modifications and variations are possible in view of the above teachings.

What is claimed is:

1. A portable electronic device, comprising:
a display;
a sensor to detect a presence of an operable object near the portable electronic device;
a processor to cause the display to depict an interface corresponding to the operable object based at least in part on a detection of the presence of the operable object, the interface comprising an input element that provides functionality for the operable object beyond functionality available through an input element of the operable object, the input element comprising a greater number of inputs than the input element of the operable object; and
a wireless communication module to emit a signal instructing the operable object to perform an action based at least in part on an input to the interface, the action comprising control of the functionality for the operable object beyond the functionality available through the input element of the operable object.

2. The portable electronic device of claim 1, wherein:
the portable electronic device comprises a head-mounted device, a smart phone, a smart watch, or a tablet computing device;
the operable object is publically available and includes a physical input component;
the interface corresponds to the physical input component; and
the sensor detects the presence of the operable object based at least in part on receiving a radio wave emitted by the operable object.

3. The portable electronic device of claim 2, wherein:
the physical input component comprises a button;
the interface visually resembles the button and the input comprises a touch input; and
the signal informs the operable object of a presence of a user at the operable object.

4. The portable electronic device of claim 1, wherein:
the signal comprises a first signal; and
the portable electronic device downloads information based on at least one of the sensor detecting the presence of the operable object or the wireless communication module receiving a second signal from the operable object.

5. The portable electronic device of claim 4, wherein a characteristic of the input element of the interface correlates to the information.

6. The portable electronic device of claim 1, wherein:
the signal comprises a first signal;
the wireless communication module is configured to receive a second signal from the operable object; and
the processor performs an action based at least in part on the second signal.

7. The portable electronic device of claim 1, wherein causing the display to depict an interface corresponding to the operable object comprises causing the display to depict the interface on a portion of the display.

8. An operable device, comprising:
a controller;
an operable component;
an analog input component coupled to the controller; and
a communication module configured to:
transmit a first input corresponding to the analog input to be displayed by the portable electronic device;
transmit a second input to be displayed by the portable electronic device, the second input having a different number of input elements than an input available at the operable device; and
receive a signal from the portable electronic device, the signal comprising instructions, the controller causing the operable component to perform an action based at least in part on the instructions, the action comprising control of additional aspects of the operable object beyond functionality available through the analog input component of the operable device.

9. The operable device of claim 8, wherein:
the communication module is configured to transmit identification information to the portable electronic device;
the identification information comprises a unique operable device identifier;
the signal further comprises a unique user identifier; and
the action comprises a transaction.

10. The device of claim 9, wherein the identification information comprises at least one of information related to a type of the operable device or a location of the operable device.

11. The device of claim 9, wherein the communication module continuously transmits the identification information.

12. The operable device of claim 8, further comprising a touchscreen input component.

13. The operable device of claim 8, wherein the analog input component comprises at least one of a button, a switch, a toggle, a lever, or a knob.

14. The device of claim 8, wherein the communication module is further configured to transmit information relating to at least one of a size, an appearance, or a position of an input element of a user interface to be depicted by the portable electronic device.

15. The device of claim 8, wherein the communication module comprises at least one of a Ultra Wideband (UWB) module, a Bluetooth module, a Wi-Fi module, or a Near-Field Communication (NFC) module.

16. The device of claim 8, wherein the portable electronic device comprises a head-mounted device, a smart watch, a smart phone, or a tablet computing device.

17. A method, comprising:
detecting an operable device;
receiving information based at least in part on detecting the operable device;
generating a user interface on an electronic device based on the received information, at least one of a number, size, shape, or configuration of input elements of the user interface controlled by a user of the electronic device, the user interface comprising a greater number of input elements than an input component of the operable device;
receiving an input from a user at the user interface; and
emitting a signal comprising instructions for the operable device to perform an action associated with the input, the action comprising control over additional functionality beyond a functionality available through the input component of the operable device.

18. The method of claim 17, further comprising prompting the user to initiate receiving the information.

19. The method of claim 17, wherein the operable device comprises a publically available physical machine.

20. The method of claim 17, wherein the input comprises a touch input, a voice input, a gesture input, a sliding-touch input, or a near-touch input.

* * * * *